(12) United States Patent
Watanabe et al.

(10) Patent No.: US 9,830,363 B2
(45) Date of Patent: Nov. 28, 2017

(54) IMAGE EVALUATION APPARATUS, IMAGE EVALUATION METHOD, AND COMPUTER PROGRAM PRODUCT

(71) Applicant: KABUSHIKI KAISHA TOSHIBA, Tokyo (JP)

(72) Inventors: Tomoki Watanabe, Tokyo (JP); Susumu Kubota, Tokyo (JP); Satoshi Ito, Kanagawa (JP); Tomohiro Nakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 15/018,986

(22) Filed: Feb. 9, 2016

(65) Prior Publication Data

US 2016/0239984 A1 Aug. 18, 2016

(30) Foreign Application Priority Data

Feb. 12, 2015 (JP) ................................. 2015-025643

(51) Int. Cl.
*G06K 9/00* (2006.01)
*G06F 17/30* (2006.01)
*G06K 9/46* (2006.01)

(52) U.S. Cl.
CPC .... *G06F 17/3053* (2013.01); *G06F 17/30256* (2013.01); *G06K 9/4642* (2013.01)

(58) Field of Classification Search
CPC .............. G06K 9/4642; G06F 17/3053; G06F 17/30256
See application file for complete search history.

(56) References Cited

U.S. PATENT DOCUMENTS 7,454,058 B2 11/2008 Porikli
8,428,353 B2 4/2013 Nishiyama et al.
(Continued)

FOREIGN PATENT DOCUMENTS

JP 2008-530627 8/2008
JP 2010-55576 3/2010
(Continued)

OTHER PUBLICATIONS

Dalal, N., et al., "Histograms of Oriented Gradients for Human Detection", IEEE Computer Society Conference on Computer Vision and Pattern Recognition (CVPR'05), vol. 1, pp. 886-893, (2005).
(Continued)

*Primary Examiner* — Yon Couso
(74) *Attorney, Agent, or Firm* — Finnegan, Henderson, Farabow, Garrett & Dunner, L.L.P.

(57) ABSTRACT

According to an embodiment, an apparatus includes a calculator, an pixel evaluator, an accumulator, and an area evaluator. The calculator is configured to calculate a feature of an image for each pixel in image data. The pixel evaluator is configured to produce a score that evaluates the feature for each pixel. The accumulator is configured to calculate, for each pixel, a cumulative score obtained by accumulating all scores in an area including a minor angle formed by a half line in a first direction from the each pixel position and another half line in a second direction from the each pixel position. The area evaluator is configured to calculate an evaluation value that is a total of the scores in a quadrilateral area enclosed by two lines of the first direction and two lines of the second direction based on the cumulative scores at pixel positions at vertexes of the quadrilateral area.

19 Claims, 11 Drawing Sheets

(56) References Cited

U.S. PATENT DOCUMENTS

| | | |
|---|---|---|
| 8,447,114 B2 | 5/2013 | Watanabe et al. |
| 8,582,880 B2 | 11/2013 | Ito et al. |
| 8,611,645 B2 | 12/2013 | Sumiyoshi et al. |
| 2013/0279746 A1 | 10/2013 | Akimoto et al. |
| 2016/0048536 A1* | 2/2016 | Di .................... G06F 17/30247 382/165 |

FOREIGN PATENT DOCUMENTS

| | | |
|---|---|---|
| JP | 2010-198361 | 9/2010 |
| JP | 4970381 | 7/2012 |
| JP | 5095790 | 12/2012 |
| JP | 5214367 | 6/2013 |
| JP | 2013-164643 | 8/2013 |
| JP | 5417368 | 2/2014 |

OTHER PUBLICATIONS

Watanabe, T., et al., "Co-occurrence Histograms of Oriented Gradients for Human Detection", IPSJ Transactions on Computer Vision and Applications, vol. 2, pp. 39-47 (2010).

Ojala, T., et al., "Performance Evaluation of Texture Measures with Classification Based on Kullback Discrimination of Distributions", IEEE, ICPR, vol. 1, pp. 582-585, (1994).

Ito, S., et al., "Object Classification Using Heterogeneous Co-occurrence Features", ECCV, Part II, LNCS 6312, pp. 209-222 (2010).

* cited by examiner

IMAGE EVALUATION APPARATUS, IMAGE EVALUATION METHOD, AND COMPUTER PROGRAM PRODUCT

CROSS-REFERENCE TO RELATED APPLICATION

This application is based upon and claims the benefit of priority from Japanese Patent Application No. 2015-025643, filed on Feb. 12, 2015; the entire contents of which are incorporated herein by reference.

FIELD

Embodiments described herein relate generally to an image evaluation apparatus, an image evaluation method, and a computer program product.

BACKGROUND

In image recognition, a feature of an image is evaluated so as to determine whether an area in the image is a specific object such as a human, for example. Various feature descriptors are known that are used for evaluating features of images.

As one of the various feature descriptors, a histogram-based feature descriptor such as histograms of oriented gradients (HOG) feature descriptor is known. In the use of the histogram-based feature descriptor, a total value of the feature descriptors of respective pixels in an area is used for evaluation. When an area in an image is evaluated using such a histogram-based feature descriptor, a calculation of the feature descriptors of respective pixels and a calculation for accumulating the feature descriptors in the area are performed, and furthermore, a calculation should be performed for evaluating the accumulated feature descriptors. As a result, a high calculation cost is required.

DETAILED DESCRIPTION

According to an embodiment, an image evaluation apparatus includes a feature descriptor calculator, a pixel evaluator, a score accumulator, and an area evaluator. The feature descriptor calculator is configured to calculate a feature descriptor that indicates a feature of an image for each pixel position in image data. The pixel evaluator is configured to produce a score that evaluates the feature descriptor for each pixel position in the image data. The score accumulator is configured to calculate, for each pixel position in the image data, a cumulative score obtained by accumulating all scores in an area including a minor angle that is formed by a half line extending in a predetermined first direction from the each pixel position serving as a starting point and another half line extending in a predetermined second direction from the each pixel position. The area evaluator is configured to calculate an area evaluation value that is a total of the scores in a quadrilateral area enclosed by two lines in parallel with the first direction and two lines in parallel with the second direction on the basis of the cumulative scores at pixel positions at vertexes of the quadrilateral area.

The following describes an image evaluation apparatus according to an embodiment in detail with reference to the accompanying drawings. The image evaluation apparatus according to the embodiment aims to reduce a calculation cost for calculating a total of feature descriptors in an area and a calculation cost for evaluating the calculated feature descriptors.

Figure 1:
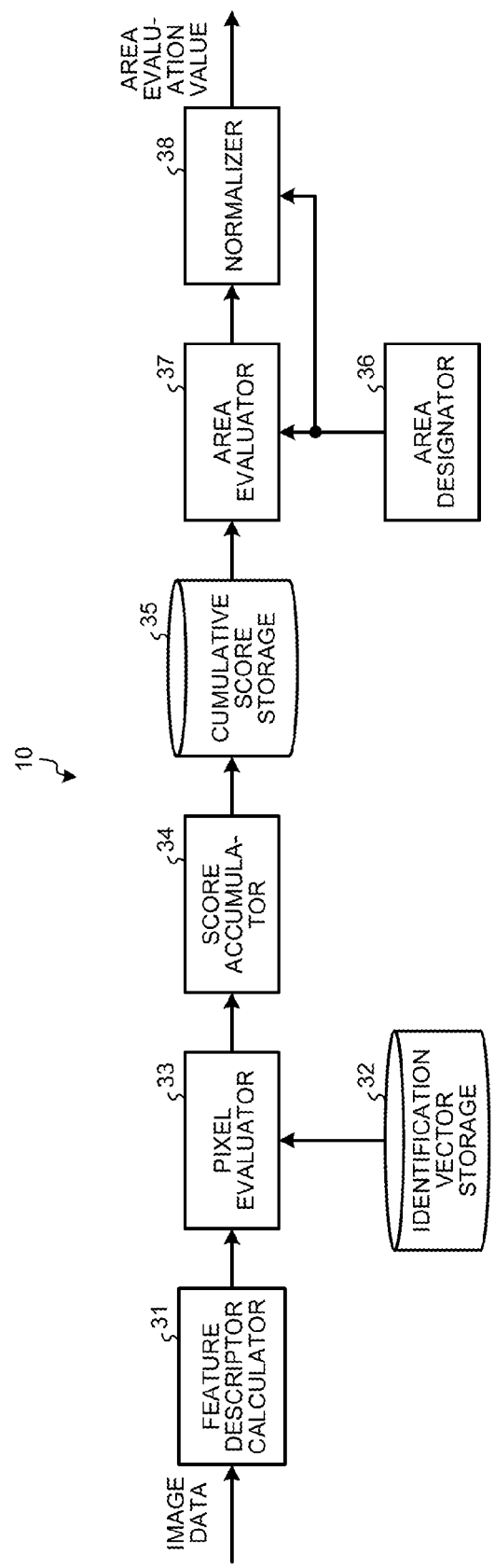
FIG. 1 is a schematic diagram illustrating an image evaluation apparatus according to an embodiment.

FIG. 1 is a schematic diagram illustrating an image evaluation apparatus 10 according to the embodiment. The image evaluation apparatus 10 includes a feature descriptor calculator 31, an identification vector storage 32, a pixel evaluator 35, a score accumulator 34, a cumulative score storage 35, an area designator 36, an area evaluator 37, and a normalizer 38.

The feature descriptor calculator 31 acquires image data of one frame from the outside. The feature descriptor calculator 31 calculates a feature descriptor that indicates the feature of the image for each pixel position in the image data.

The feature descriptor calculator 31 calculates a histogram-based feature descriptor. In the use of the histogram-based feature descriptor, a total value of the feature descriptors of respective pixels in an area is used for evaluation.

The feature descriptor calculator 31 calculates a histograms of oriented gradients (HOG) feature descriptor, a co-occurrence histograms of oriented gradients (CoHOG) feature descriptor, a local binary patterns (LBP) feature descriptor, or a heterogeneous co-occurrence feature descriptor, for example. The HOG feature descriptor is described in the document: N. Dalai, and B. Triggs, "Histograms of Oriented Gradients for Human Detection", CVPR 2005, vol. 1, pp. 886-893, 2005. The CoHOG feature descriptor is described in the document: T. Watanabe, S. Ito, and K. Yokoi, "Co-occurrence Histograms of Oriented Gradients for Human Detection", Trans. on CVA, vol. 2, pp. 39-47, 2010. The LBP feature descriptor is described in the document: T. Ojala, M. Pietikainen, and D. Harwood, "Performance evaluation of texture measures with classification based on Kullback discrimination of distributions", ICPR 1994, vol. 1, pp. 582-585, 1994. The heterogeneous co-occurrence feature descriptor is described in the document: S. Ito and S. Kubota, "Object classification using heterogeneous co-occurrence features", ECCV 2010, Part V, pp. 701-714, 2010. The feature descriptor calculator 31 may calculate another histogram-based feature descriptor besides those feature descriptors. The feature descriptor calculator 31 may calculate not only one feature descriptor but also a plurality of feature descriptors for one pixel.

The feature descriptor calculator 31 calculates the feature descriptor of a target pixel for a feature descriptor calculation by inputting the pixel value of the pixel and pixel values of the surrounding pixels into a predetermined function and calculating the predetermined function. The feature descriptor calculator 31 calculates, for each pixel, as the feature descriptor, a vector that includes a plurality of values (elements).

For example, when calculating the HOG feature descriptor, the feature descriptor calculator 31 calculates a two-dimensional vector including a luminance gradient direction and a luminance gradient intensity. More specifically, the feature descriptor calculator 31 calculates luminance gradients dx and dv in the quantized directions orthogonal to each other using Sobel filter or Roberts filter, for example. The feature descriptor calculator 31 calculates $\tan^{-1}(dx/dy)$ to calculate the luminance gradient direction. The feature descriptor calculator 31 calculates $[(dx)^2+(dy)^2]^{1/2}$ to calculate the luminance gradient intensity. When the luminance gradient is quantized in 18 directions, the luminance gradient direction and the luminance gradient intensity are represented in 18 combinations of codes and actual number values.

For example, when calculating the CoHOG feature descriptor, the feature descriptor calculator 31 calculates 30 dimensional vector including 30 sets of the combination of two adjacent pixels in the quantized luminance gradient direction. When the luminance gradient direction is quantized in eight directions, the combination of two points becomes 64 codes.

For example, when calculating the LEP feature descriptor, the feature descriptor calculator 31 calculates a one-dimensional vector including 256 codes defined based on a magnitude relation among adjacent eight pixels. For example, when calculating the heterogeneous co-occurrence feature descriptor, the feature descriptor calculator 31 calculates a vector including a quantized luminance gradient direction, a hue, a color difference direction, and a color difference sign.

The identification vector storage 32 stores therein a preliminarily registered identification vector. The identification vector has the same dimension as the feature descriptor calculated by the feature descriptor calculator 31. For example, the identification vector is calculated by learning using a support vector machine or a neural network with learning data of a histogram of the feature descriptors calculated by the same manner as the feature descriptor calculator 31 from a preliminarily prepared image in an area including a specific object such as a human. The identification vector is therefore the feature descriptor that is produced by learning from an image of a specific object such as a human, for example.

Figure 2:
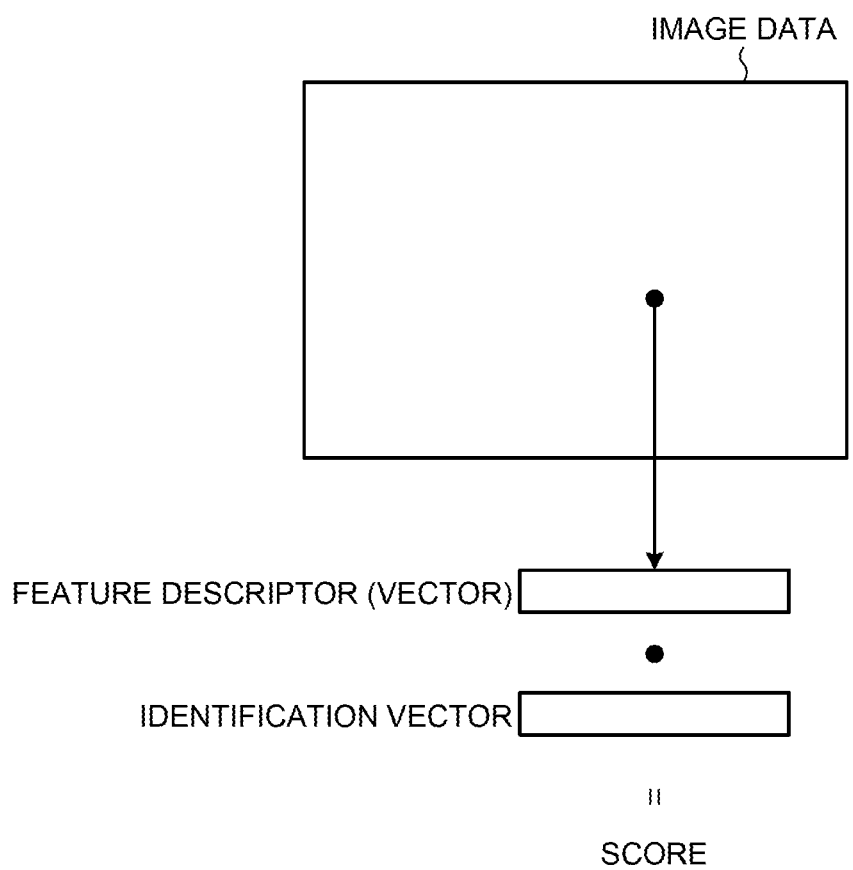
FIG. 2 is a schematic diagram illustrating a calculation example of a score.

The pixel evaluator 33 produces, for each pixel position in the image data, a score that evaluates the feature descriptor on the basis of the identification vector. As illustrated in FIG. 2, the pixel evaluator 33 produces, for each pixel position in the image data, a norm of the feature descriptor and the identification vector as the score, for example.

The pixel evaluator 33 may calculate the score by inputting the feature descriptor and the identification vector into a function. Alternatively, a table may be preliminarily produced in which the scores corresponding to the respective values of the feature descriptors are stored on the basis of the identification vector, and the pixel evaluator 33 may acquire, from the table, the score corresponding to the input feature descriptor.

When the HOG feature descriptor is used, the pixel evaluator 33 calculates a product of a value of the identification vector and the luminance gradient intensity as the score, for example. When the CoHOG feature descriptor or the LEP feature descriptor is used, the pixel evaluator 33 acquires the score corresponding to the feature descriptor from the table, for example.

The score accumulator 34 calculates, for each pixel position in the image data, a cumulative score obtained by accumulating all of the scores in an area on an minor angle side (smaller angle side). The area is sandwiched between a half line extending in a predetermined first direction from the calculation target pixel (at the each pixel position) serving as the starting point and another half line extending in a predetermined second direction from the calculation target pixel (at the each pixel position) serving as the starting point. The score accumulator 34 writes the cumulative score at each pixel position in the image data into the cumulative score storage 35. Processing in the score accumulator 34 is described later with reference to FIGS. 3 to 5.

The cumulative score storage 35 stores therein the cumulative score at each pixel position in the image data.

The area designator 36 designates a quadrilateral area enclosed by two lines in parallel with the first direction and two lines in parallel with the second direction. The first and the second directions are the same as the directions by which the score accumulator 34 specifies the area used for accumulating the scores. The detail of the quadrilateral area is described later with reference to FIGS. 6 to 8. The area designator 36 designates a plurality of quadrilateral areas by changing their locations and sizes.

The area evaluator 37 calculates, every time the area designator 36 designates the quadrilateral area, an area evaluation value that is a total of the scores in the designated quadrilateral area on the basis of the cumulative scores at the pixel positions at the vertexes of the quadrilateral area out of the cumulative scores at the respective pixel positions stored in the cumulative score storage 35. Processing in the area evaluator 37 is described later with reference to FIGS. 6 to 8.

The normalizer 38 normalizes the area evaluation value calculated by the area evaluator 37 by the area of the quadrilateral area designated by the area designator 36. For example, the normalizer 38 performs normalization by dividing the area evaluation value by the area of the quadrilateral area. As a result, the normalizer 38 can compare the area evaluation values of the quadrilateral areas having different sizes with one another. When the area (size) of the quadrilateral area designated by the area designator 36 is constant, the image evaluation apparatus 10 may output the area evaluation value without being provided with the normalizer 38.

The image evaluation apparatus 10 outputs the area evaluation value normalized by the normalizer 38 to the outside. The area evaluation value output to the outside is checked by an image identification unit whether the area evaluation value exceeds (or falls below) a threshold, for example. When the area evaluation value exceeds (or falls below) the threshold, it is determined that the corresponding quadrilateral area includes a specific object such as a human.

Figure 3:
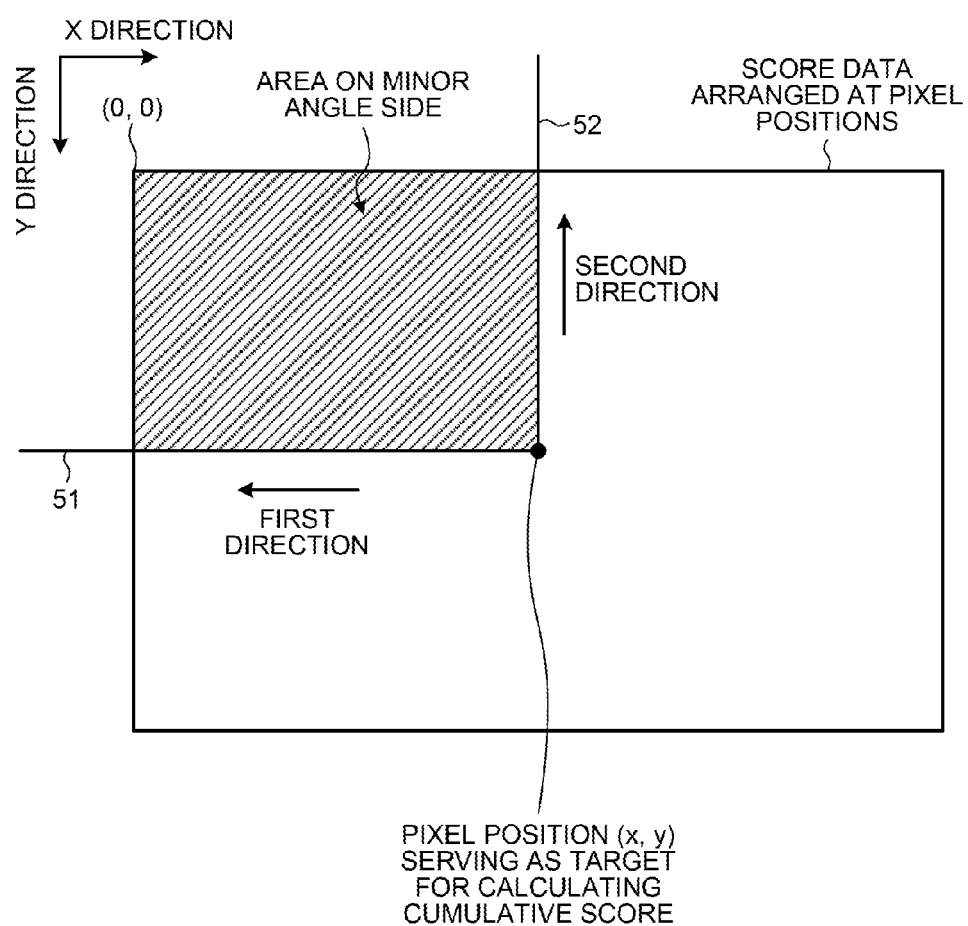
FIG. 3 is a schematic diagram illustrating an area used for accumulating scores.

FIG. 3 is a schematic diagram illustrating an area used for accumulating the scores when the cumulative score at a certain pixel position (x, y) is calculated.

The pixels included in the image data are two-dimensionally arranged in two directions (the x direction and the y direction) orthogonal to each other. The x direction (a first arrangement direction) is directed from left to right in the horizontal direction. The y direction (a second arrangement direction) is directed from up to down in the vertical direction.

In the image evaluation apparatus 10, the first and the second directions are preliminarily set with respect to the arrangement directions of the pixels in the image data. In the example, the first direction is opposite to the x direction (direction directed from right to left in the horizontal direction). The second direction is opposite to the y direction (direction directed from down to up in the vertical direction).

The score accumulator 34 calculates the cumulative score for each pixel position in the image data. When calculating the cumulative score at a certain target pixel, the score accumulator 34 accumulates all of the scores in the area on the minor angle side. The area is sandwiched between the half line extending in the first direction from the target pixel serving as the starting point and the half line extending in the second direction from the target pixel serving as the starting point.

More specifically, as illustrated in FIG. 3, the score accumulator 34 accumulates the scores of all of the pixels included in the hatched area when the target pixel for cumulative score calculation is located at the position (x, y). The pixel located at the position (x, y) is also described as the pixel (x, y) in the following description. The half line extending in the first direction from the target pixel (x, y) serving as the starting point is a half line 51 extending in the direction opposite to the x direction (extending on the left side in the horizontal direction) from the pixel position (x, y). The half line extending in the second direction from the target pixel (x, y) serving as the starting point is a half line 52 extending in the direction opposite to the y direction (extending on the up side in the vertical direction) from the pixel position (x, v). The area on the minor angle side of the target pixel (x, y) is a rectangular area having one diagonal vertex at the position (0, 0) at which the pixel arrangement starts in the image data and the other diagonal vertex at the target pixel position (x, y).

The score accumulator 34 calculates, for all of the pixels included in the image data, the cumulative score obtained by accumulating all of the scores in the area on the minor angle side.

Figure 4:
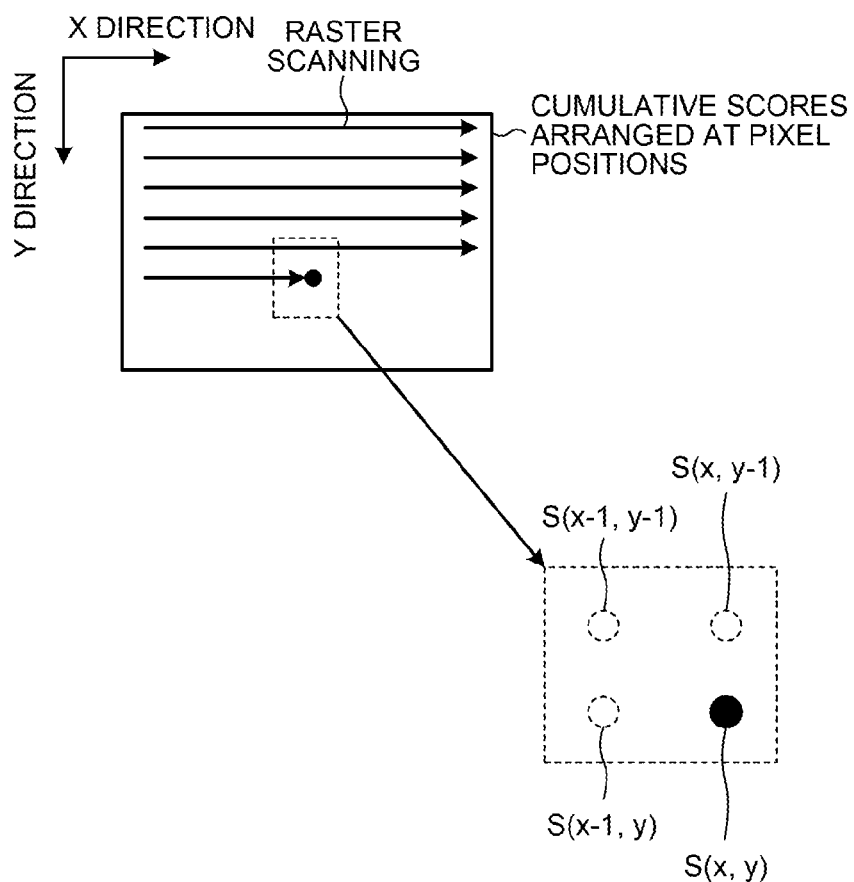
FIG. 4 is a schematic diagram to explain a calculation of a cumulative score for each pixel position.

FIG. 4 is a schematic diagram to explain the cumulative score calculation performed for each pixel position. The score accumulator 34 selects, one by one, the pixels two-dimensionally arranged in the first and the second directions in the image data by raster scanning so as to calculate the cumulative score for each pixel position in the image data.

As illustrated in FIG. 4, the score accumulator 34 starts the selection from the upper left pixel when the pixels included in the image data are two-dimensionally arranged in the x and the y directions. The score accumulator 34, then, selects the pixels in one horizontal line one by one in the right direction. The score accumulator 34, then, selects the leftmost pixel in the horizontal line under the scanned horizontal line by one pixel, and repeats the one-by-one selection of the pixels in the one horizontal line in the right direction. When completing the selection of the rightmost pixel in the lowest horizontal line, the score accumulator 34 ends the selection.

Let the pixel selected by the raster scanning be located at the position (x, y).

In this case, the score accumulator 34 acquires a score a (x, y) of the selected pixel (x, y).

The score accumulator 34 further acquires a cumulative score S(x−1, y) at a first pixel (x−1, y), a cumulative score S(x, y−1) at a second pixel (x, y−1), and a cumulative score S(x−1, y−1) at a third pixel (x−1, y−1). The first pixel (x−1, y) is the pixel just before the selected pixel in the first arrangement direction (x direction). The second pixel (x, y−1) is the pixel just before the selected pixel in the second arrangement direction (y direction). The third pixel (x−1, y−1) is the pixel just before the first pixel (x−1, y) in the second arrangement direction (y direction).

When the cumulative scores are calculated by sequentially selecting the pixels by raster scanning, the cumulative scores at the first pixel (x−1, y), at the second pixel (x, y−1), and at the third pixel (x−1, y−1) are already calculated. When the selected pixel position is the position of the leftmost pixel in the horizontal line, the first pixel (x−1, y) and the third pixel (x−1, y−1) are not present. When the selected pixel position is the position of the pixel in the top horizontal line, the second pixel (x, y−1), and the third pixel (x−1, y−1) are not present. The score accumulator 34 calculates the cumulative score at the nonexistent pixel to be zero.

The score accumulator 34 calculates the cumulative score S(x, y) at the selected pixel by Equation (1):

$$S(x, y)=a(x, y)+S(x-1, y)+S(x, y-1)-S(x-1, y-1) \qquad (1)$$

The score accumulator 34 calculates, as the cumulative score at the selected pixel, a value obtained by subtracting the cumulative score at the third pixel, which is lust before the first pixel in the second arrangement direction, from a sum of the score at the selected pixel, the cumulative score at the first pixel, which is lust before the selected pixel in the first arrangement direction, and the cumulative score at the second pixel, which is just before the selected pixel in the second arrangement direction.

The calculation described above makes it possible for the score accumulator 34 to readily calculate the cumulative score obtained by accumulating all of the scores in the area on the minor angle side.

Figure 5:
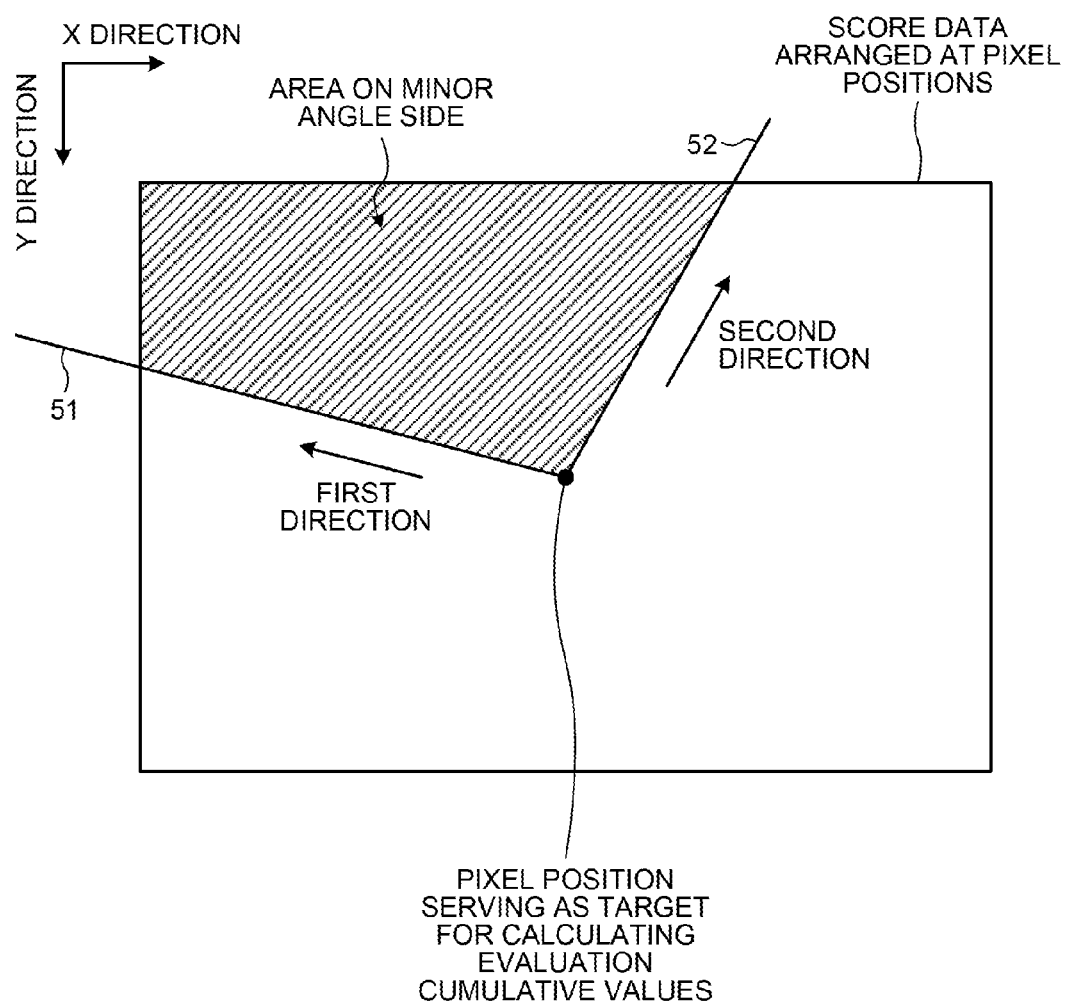
FIG. 5 is a schematic diagram illustrating another example of the area used for accumulating the scores.

FIG. 5 is a schematic diagram illustrating another example of the area used for accumulating the scores. The first and the second directions are not limited to be set the directions opposite to the arrangement directions of the pixels. For example, as illustrated in FIG. 5, the image evaluation apparatus 10 may allow the first and the second directions to be set to other different directions from each other.

For example, the first and the second directions may be the two directions orthogonal to each other and rotated from the arrangement directions (the x and the y directions) of the pixels in the image data by 22.5, 45, or 67.5 degrees. The first and the second directions may not be orthogonal to each other.

In such a case, the half line 51 extending in the first direction and the half line 52 extending in the second direction pass through between the pixels. In this case, the score accumulator 34 accumulates the scores at the pixel positions inside the half line 51 extending in the first direction and the half line 52 extending in the second direction (pixel positions on the minor angle side). The pixel positions include the pixel positions on the half lines 51 and 52.

Figure 6:
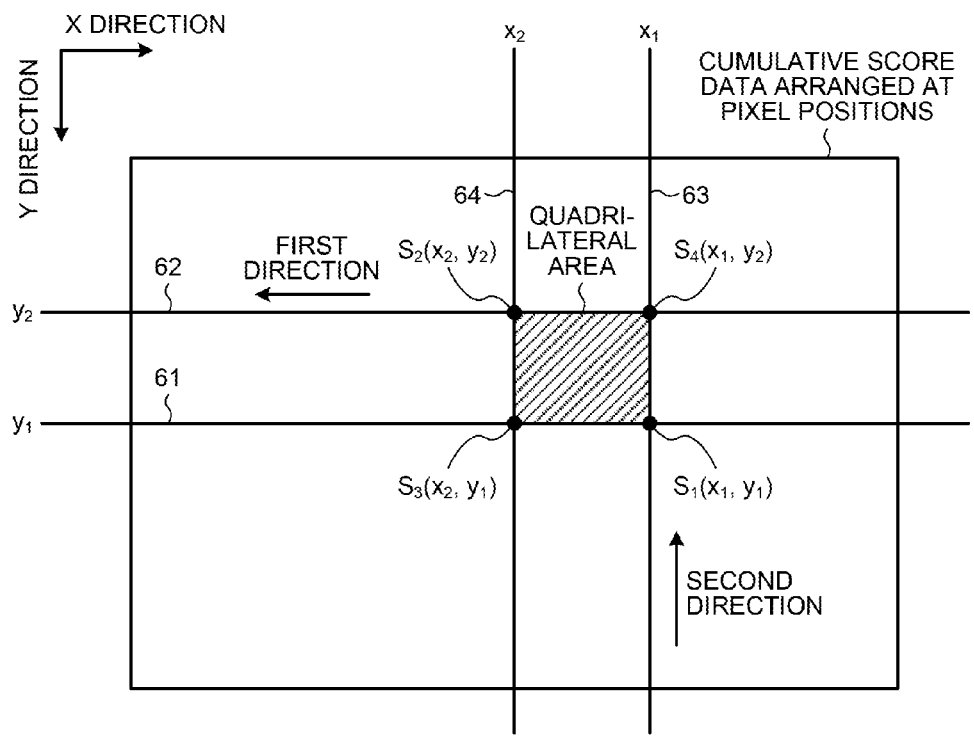
FIG. 6 is a schematic diagram illustrating an example of a quadrilateral area.

FIG. 6 is a schematic diagram illustrating an example of the quadrilateral area. The area designator 36 designates the quadrilateral area. The quadrilateral area is enclosed by two lines in parallel with the first direction and two lines in parallel with the second direction.

In the example, the pixels included in the image data are two-dimensionally arranged in the x and the y directions. The first direction is opposite to the x direction while the second direction is opposite to the y direction. In the example, the area designator 36, thus, designates the quadrilateral area enclosed by a first line 61 and a second line 62 that are in parallel with the x direction (the horizontal direction), and a third line 63 and a fourth line 64 that are in parallel with the y direction (the vertical direction).

Let the pixel position of the first line 61 in the y direction be $y_1$ while the pixel position of the second line 62 in the y direction be $y_2$. Let the pixel position of the third line 63 in the x direction be $x_1$ while the pixel position of the fourth line 64 in the x direction be $x_2$.

In this case, the quadrilateral area has a first vertex $x_1, y_1$), a second vertex $(x_2, y_2)$, a third vertex $(x_2, y_1)$, and a fourth vertex $(x_1, y_2)$. The first vertex $(x_1, y_1)$ is the lower right vertex in the quadrilateral area. The second vertex $(x_2, y_2)$ is the upper left vertex in the quadrilateral area. The third vertex $(x_2, y_1)$ is the lower left vertex in the quadrilateral area. The fourth vertex $(x_1, y_2)$ is the upper right vertex in the quadrilateral area.

The second vertex $(x_2, y_2)$ is located on the first direction side from the first vertex $(x_1, y_1)$ and also on the second direction side. The second vertex $(x_2, y_2)$ is, thus, located in the area on the minor angle side sandwiched between the half line extending in the first direction (direction directed from right to left in the horizontal direction) from the first vertex $(x_1, y_1)$ serving as the starting position and the half line extending in the second direction (direction directed from down to up in the vertical direction) from the first vertex $(x_1, y_1)$ serving as the starting position. The third vertex $(x_2, y_i)$ and the fourth vertex $(x_1, y_2)$ differ from the first vertex $(x_1, y_1)$ and the second vertex $(x_2, y_2)$.

The area evaluator 37 acquires, from the cumulative score storage 35, the cumulative scores at the pixel positions at the vertexes of the quadrilateral area designated by the area designator 36. In this example, the area evaluator 37 reads out a cumulative score $S_1(x_1, y_1)$ at the first vertex, a cumulative score $S(x_2, y_2)$ at the second vertex, a cumulative score $S_3(x_2, y_1)$ at the third vertex, and a cumulative score $S_4(x_1, y_2)$ at the fourth vertex.

Figure 7:
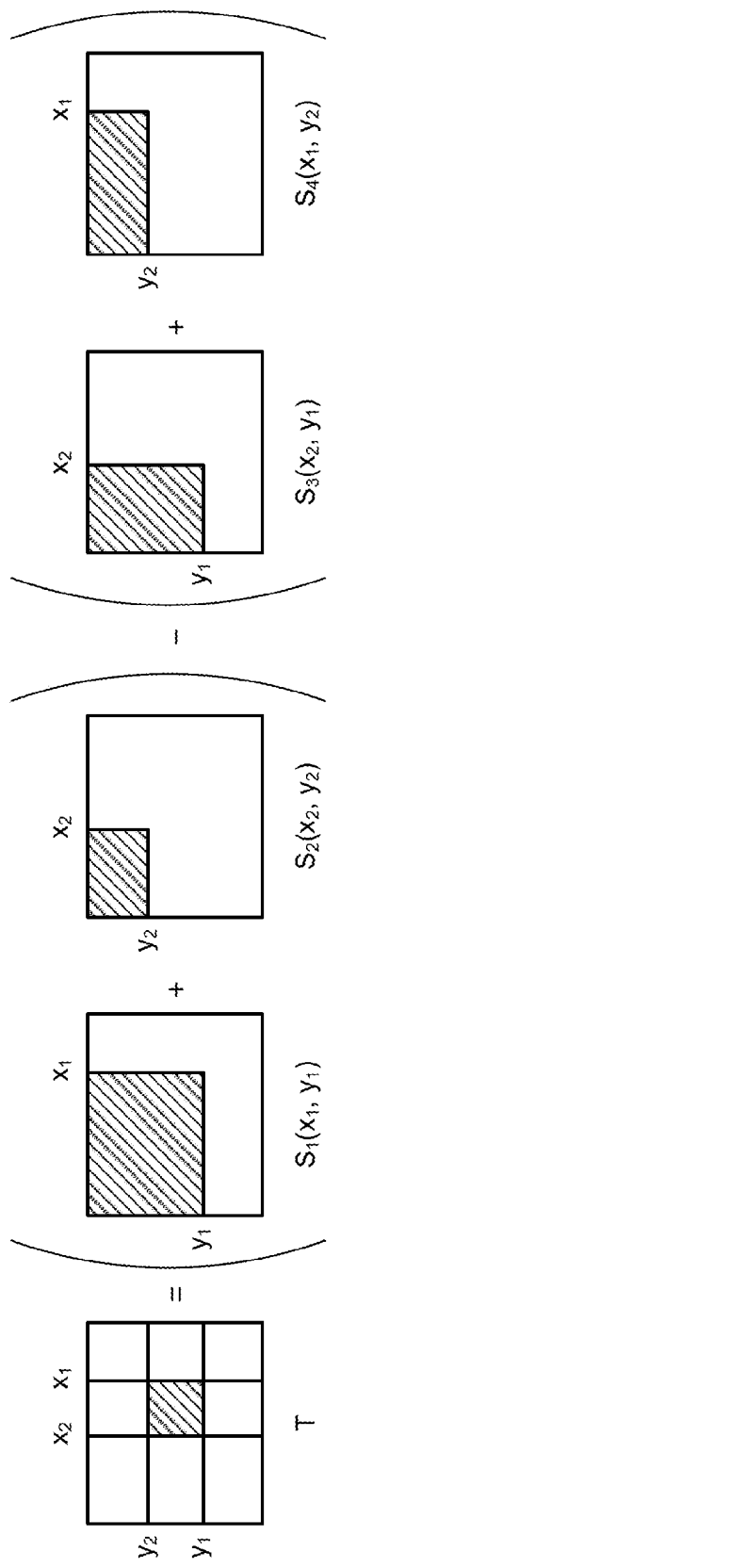
FIG. 7 is a schematic diagram to explain a calculation of an area evaluation value.

FIG. 7 is a schematic diagram to explain the calculation of the area evaluation value. The area evaluator 37 calculates a total T of the scores in the quadrilateral area on the basis of the cumulative score $S_1(x_1, y_1)$ at the first vertex, the cumulative score $S_2(x_2, y_2)$ at the second vertex, the cumulative score $S_3(x_2, y_1)$ at the third vertex, and the cumulative score $S_4(x_1, y_2)$ at the fourth vertex, which have been read out.

More specifically, the area evaluator 37 calculates the total T of the scores in the quadrilateral area using Equation (2).

$$T=(S_1(x_1, y_1)+S_2(x_2, y_2))-(S_3(x_2, y_1)+S_4(x_i, y_2)) \quad (2)$$

In other words, the area evaluator 37 calculates, as the total T, a value obtained by subtracting a second addition value from a first addition value. The first addition value is the sum of the cumulative score $S_1(x_1, y_1)$ at the first vertex and the cumulative score $S_2(x_2, y_2)$ at the second vertex. The second addition value is the sum of the cumulative score $S_3(x_2, y_1)$ at the third vertex and the cumulative score $S_4(x_1, y_2)$ at the fourth vertex.

The area evaluator 37 outputs the calculated total T as the area evaluation value in the designated quadrilateral area. In this way, the area evaluator 37 can simply calculate the area evaluation value in the designated quadrilateral area.

Figure 8:
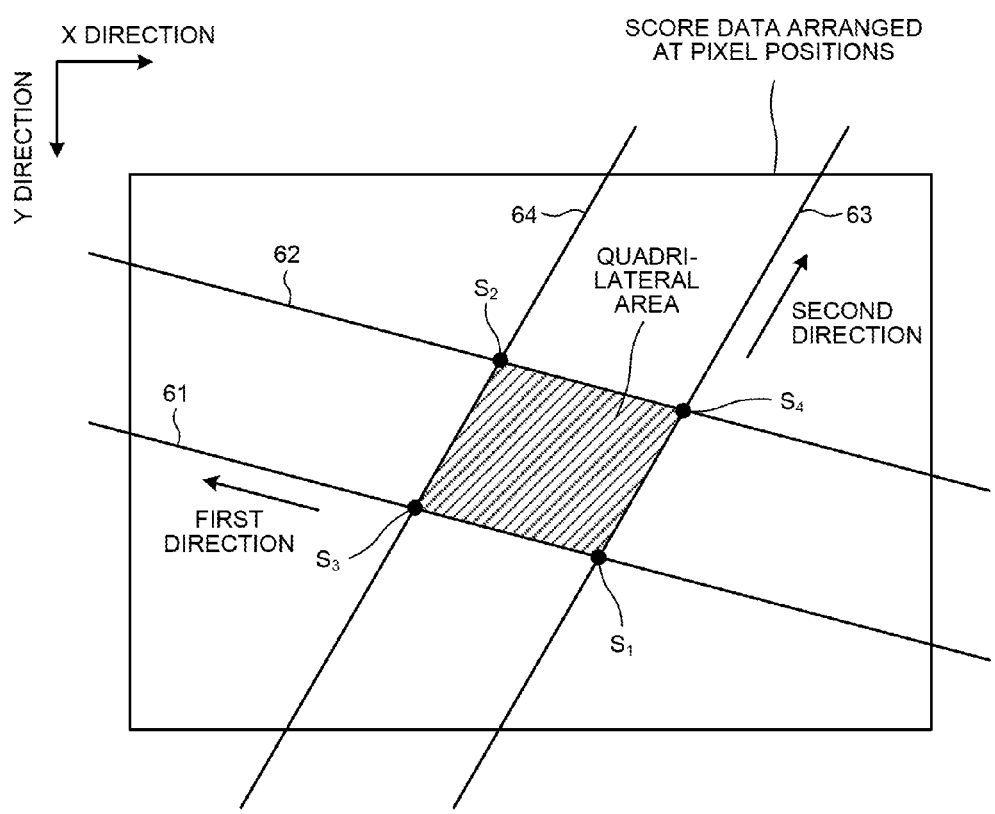
FIG. 8 is a schematic diagram illustrating another example of the quadrilateral area.

FIG. 8 is a schematic diagram illustrating another example of the quadrilateral area. When the first direction is not in parallel with the x direction or the second direction is not in parallel with the y direction, the area designator 36 designates the quadrilateral area having a parallelogram shape, which is not a rectangular shape, as illustrated in FIG. 8.

When the first vertex $(x_1, y_1)$, the second vertex $(x_2, y_2)$, the third vertex $(x_2, y_1)$, or the fourth vertex $(x_1, y_2)$ is not present at the pixel position, the area evaluator 37 calculates the cumulative score at the corresponding vertex by interpolating the cumulative scores at the surrounding pixels.

The image evaluation apparatus 10 can evaluate an object rotated from the arrangement directions of the pixels or an object having a non-rectangular shape, for example, in accordance with the case where the first and the second directions are not in parallel with the arrangement directions (the x and the y directions) of the pixels in the image data as described above.

Figure 9:
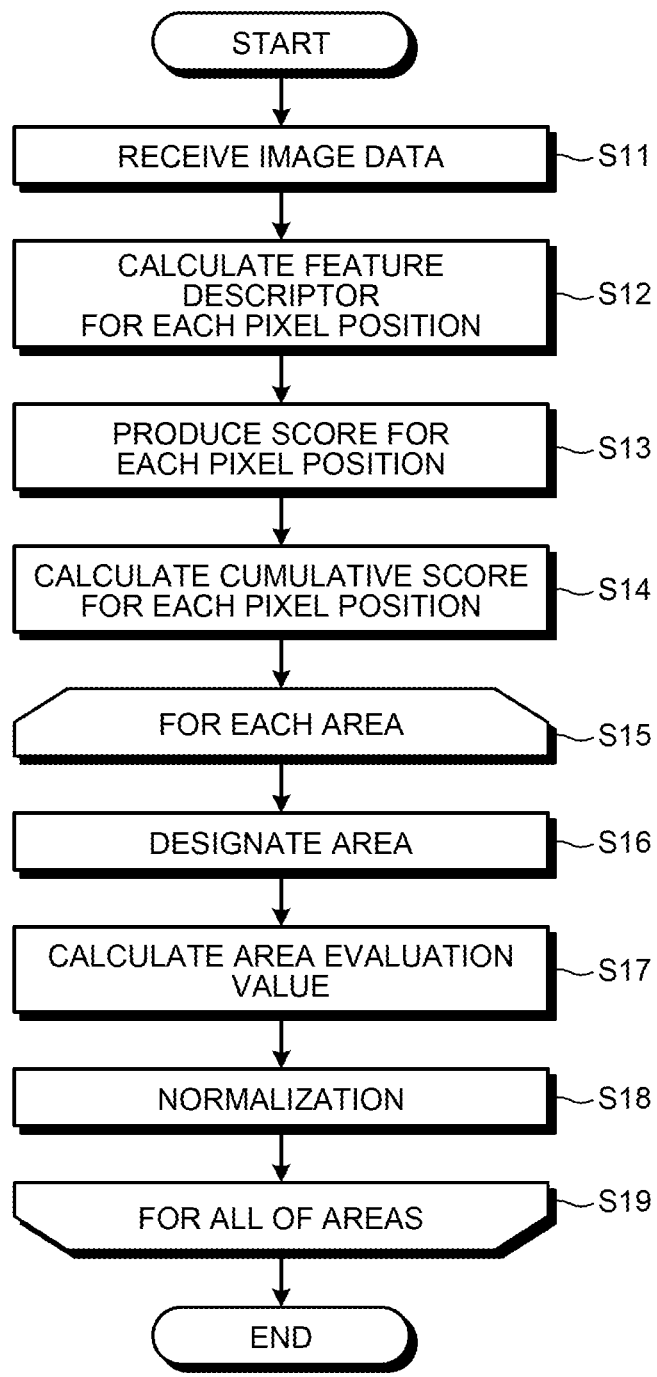
FIG. 9 is a flowchart illustrating a procedure of processing performed by the image evaluation apparatus.

FIG. 9 is a flowchart illustrating a procedure of the processing performed by the image evaluation apparatus 10. The image evaluation apparatus 10 performs the processing from step S11 to step S19 illustrated in FIG. 9.

The feature descriptor calculator 31 receives the image data of one frame (S11). The feature descriptor calculator 31 calculates the feature descriptor for each pixel position in the received image data (S12). The pixel evaluator 33 produces, for each pixel position in the image data, the score that evaluates the feature descriptor on the basis of the identification vector (S13).

The score accumulator 34 calculates the cumulative score for each pixel position in the image data (S14). The cumulative score calculated by the score accumulator 34 for each pixel position is stored in the cumulative score storage 35.

The image evaluation apparatus 10 repeats the processing from step S16 to step S18 for each of the different quadrilateral areas (loop processing between step S15 and step S19). The area designator 36 designates the quadrilateral area enclosed by two lines in parallel with the first direction and two lines in parallel with the second direction (S16). The area evaluator 37 calculates the area evaluation value, which is the total of the scores in the designated quadrilateral area, on the basis of the cumulative scores at the pixel positions at the vertexes of the quadrilateral area (S17). The normalizer 38 performs normalization by dividing the calculated area evaluation value by the area of the quadrilateral area (S18).

The image evaluation apparatus 10 produces the normalized area evaluation values for all of the areas, and ends the processing (S19).

The image evaluation apparatus 10 according to the embodiment does not accumulate the feature descriptor of each pixel but accumulates the score (the value that evaluates the feature descriptor by the identification vector) of each pixel, as described above. The image evaluation apparatus 10 reads out four cumulative scores at the respective vertexes of the designated quadrilateral area, and calculates the area evaluation value by performing addition and subtraction on the cumulative scores. The image evaluation apparatus 10 needs to perform the calculation for accumulating the feature descriptors in the area and the calculation for evaluating the accumulated feature descriptors only one time when the area evaluation values are produced for a plurality of different areas, thereby making it possible to reduce a calculation cost.

The image evaluation apparatus 10 can further reduce the calculation cost with increase in overlap in a plurality of areas. For example, when detecting an area of a specific object in an image, the image evaluation apparatus 10 designates the areas having different sizes at different positions in the image, and calculates the area evaluation values. For another example, when the image evaluation apparatus 10 is applied to a deformable part model used for estimating a pose of a human, the image evaluation apparatus 10 designates the areas for evaluating the positions of parts such a head, hands, and feet while minutely shifting each of the areas. For still another example, when the image evaluation apparatus 10 is applied to tracking of a specific object, the image evaluation apparatus 10 designates the areas while minutely shifting each of the areas around the position of the specific object expected from the detection results till the just before frame. In such a case, the respective areas are overlapped with one another. As a result, the image evaluation apparatus 10 can largely reduce the calculation for accumulating the feature descriptors in the area and the calculation for evaluating the accumulated feature descriptors.

Figure 10:
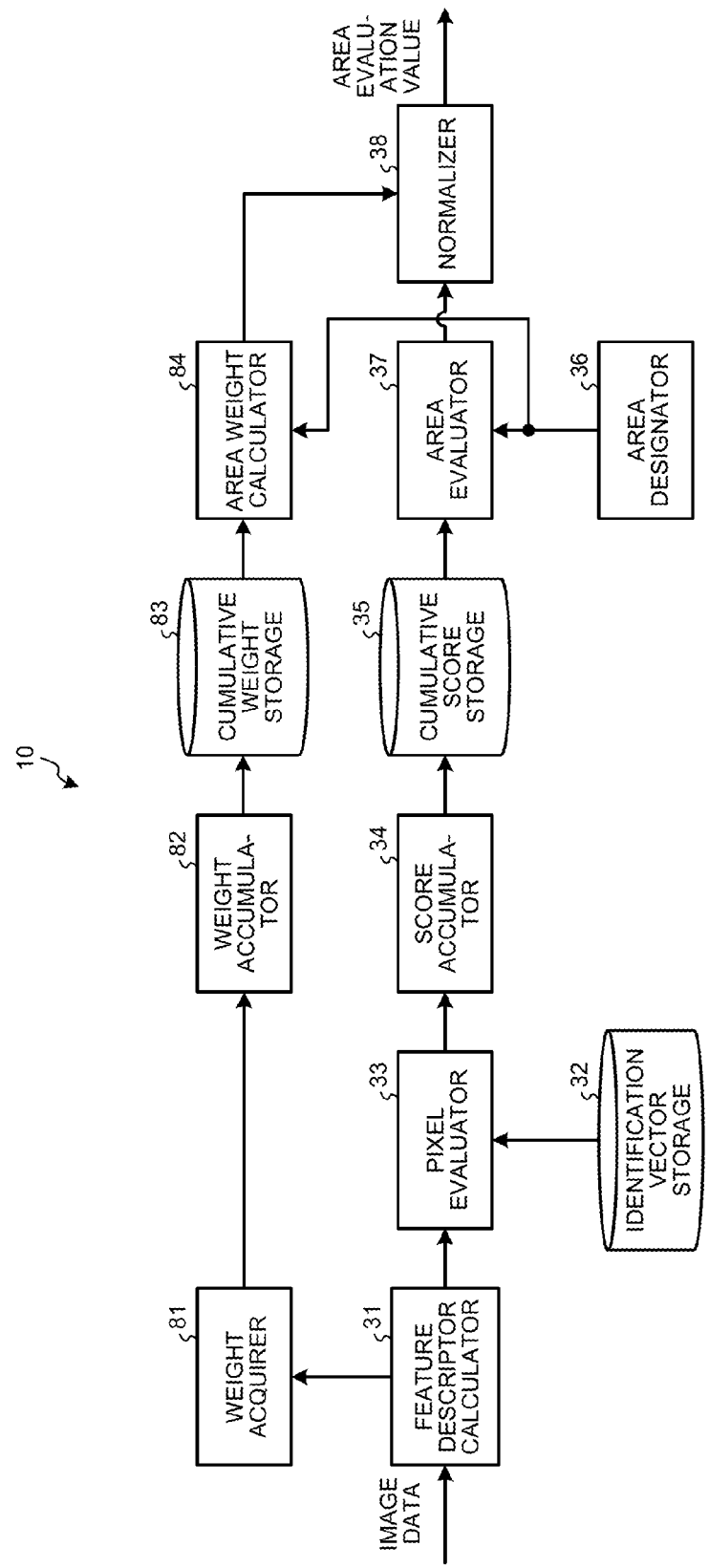
FIG. 10 is a schematic diagram illustrating the image evaluation apparatus according to a modification.

FIG. 10 is a schematic diagram illustrating the image evaluation apparatus 10 according to a modification of the embodiment. In the image evaluation apparatus 10 according to the modification, the component having the substantially same function and structure is labeled with the same numeral as that in the image evaluation apparatus 10 illustrated in FIG. 1, and the description thereof is omitted except for a different point.

The image evaluation apparatus 10 according to the modification includes the feature descriptor calculator 31, the identification vector storage 32, the score accumulator 34, the cumulative score storage 35, the area designator 36, the area evaluator 37, the normalizer 38, a weight acquirer 81, a weight accumulator 82, a cumulative weight storage 83, and an area weight calculator 84.

The weight acquirer 81 acquires a weight of the feature descriptor for each pixel position in the image data. The weight acquirer 81 may acquire one element of the feature descriptor calculated by the feature descriptor calculator 31 as the weight, for example. When the HOG feature descriptor is used, the weight acquirer 81 acquires the luminance gradient intensity as the weight. The weight acquirer 81 may acquire the weight for each pixel from the outside.

The weight accumulator 82 calculates, for each pixel position in the image data, a cumulative weight obtained by accumulating all of the weights in an area on the minor angle side. The area is sandwiched between a half line extending in parallel with the first direction from the target pixel serving as the starting point and another half line extending in parallel with the second direction from the target pixel serving as the starting point. The weight accumulator 82 accumulates all of the weights in the same area used by the score accumulator 34 for accumulating the scores.

The cumulative weight storage 83 stores therein the cumulative weight at each pixel position in the image data.

The area weight calculator 84 calculates a weight total value obtained by summing the weights in the quadrilateral area designated by the area designator 36 on the basis of the cumulative weights at the pixel positions at the vertexes of the quadrilateral area. The area weight calculator 84 calculates the weight total value by the same calculation processing as the area evaluator 37 calculates the area evaluation value.

The normalizer 38 normalizes the area evaluation value calculated by the area evaluator 37 by the cumulative weight calculated by the area weight calculator 84. For example, the normalizer 38 performs the normalization by dividing the area evaluation value calculated by the area evaluator 37 by the cumulative weight.

The image evaluation apparatus 10 according to the modification can calculate the area evaluation value normalized by the weights in the area with a low calculation cost when the feature descriptor to which a weight is set for each pixel, such as the HOG feature descriptor, is used.

Figure 11:
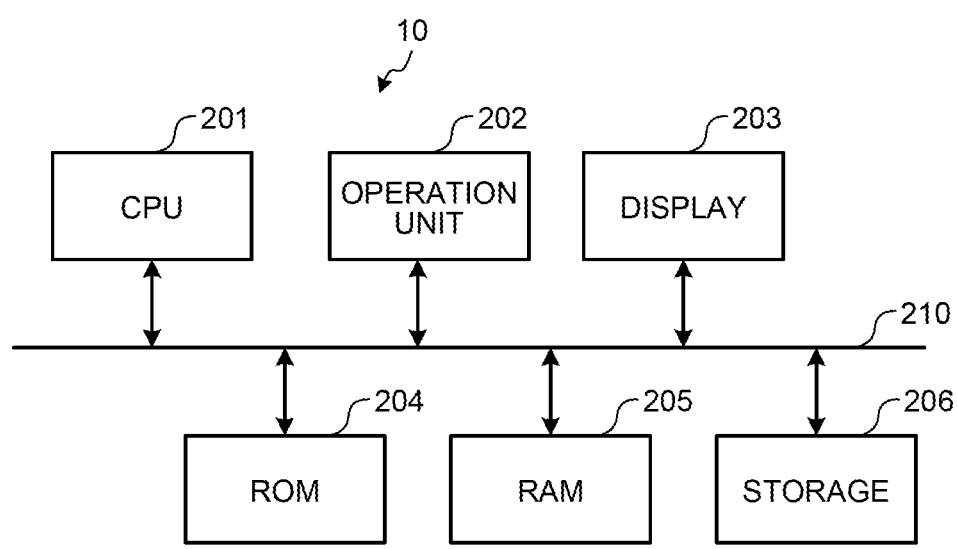
FIG. 11 is a schematic diagram illustrating an exemplary hardware structure of the image evaluation apparatus.

FIG. 11 is a schematic diagram illustrating a hardware structure of the image evaluation apparatus 10. The image evaluation apparatus 10 includes a central processing unit (CPU) 201, an operation unit 202, a display 203, a read only memory (ROM) 204, a random access memory (RAM) 205, and a storage 206. Those units are coupled with a bus 210.

The CPU 201 is a processor that executes calculation and control processing in accordance with computer programs, for example. The CPU 201 executes various types of processing by cooperation with various computer programs preliminarily stored in the ROM 204 or the storage 206 using a certain area in the RAM 205 as a working area.

The operation unit 202, which is an input device such as a mouse or a keyboard, receives information input by the user's operation as an instruction signal, and outputs the instruction signal to the CPU 201. The display 203 is a display such as a liquid crystal display (LCD). The display 203 displays various types of information on the basis of display signals from the CPU 201.

The ROM 204 stores therein the computer programs to control the image evaluation apparatus 10 and various types of setting information in a non-rewritable manner. The RAM 205 is a volatile storage medium such as a synchronous dynamic random access memory (SDRAM). The RAM 205 functions as the working area of the CPU 201.

The storage 206 is a rewritable recording device such as a semiconductor storage medium such as a flash memory or a magnetically or optically recordable storage medium. The storage 206 stores therein the computer programs and the various types of setting information, for example. The storage 206 stores therein data acquired via the operation unit 202 and a communication device, for example.

The image evaluation apparatus 10 is not limited to being achieved by the hardware structure described above. A part or the whole of the feature descriptor calculator 31, the identification vector storage 32, the pixel evaluator 33, the score accumulator 34, the cumulative score storage 35, the area designator 36, the area evaluator 37, and the normalizer 38 may be achieved by a hardware circuit such as a semiconductor integrated circuit.

The computer programs executed by the image evaluation apparatus 10 according to the embodiment are recorded and provided in a computer-readable recording medium, which may be provided as a computer program product, such as a compact disc read only memory (CD-ROM), a flexible disk (FL)), a compact disc recordable (CD-R), and a digital versatile disc (DVD), as an installable or executable file.

The computer programs executed by the image evaluation apparatus 10 according to the embodiment may be stored in a computer connected to a network such as the Internet, and provided by being downloaded via the network. The computer programs executed by the image evaluation apparatus 10 according to the embodiment may be provided or distributed via a network such as the Internet. The computer programs executed by the image evaluation apparatus 10 according to the embodiment may be embedded and provided in a ROM, for example.

The computer programs executed by the image evaluation apparatus 10 each have a module structure including the respective units (the feature descriptor calculator 31, the identification vector storage 32, the pixel evaluator 33, the score accumulator 34, the cumulative score storage 35, the area designator 36, the area evaluator 37, and the normalizer 38). The respective units are loaded on the RAM 205 when the CPU 201 (processor) reads the computer programs from the storage medium and executes the programs. As a result, the image evaluation apparatus 10 (the feature descriptor calculator 31, the identification vector storage 32, the pixel evaluator 33, the score accumulator 34, the cumulative score storage 35, the area designator 36, the area evaluator 37, and the normalizer 38) is formed on the RAM 205.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image evaluation apparatus comprising:
a memory; and
a hardware processor configured to:
 calculate a feature descriptor that indicates a feature of an image for each pixel position in image data;
 produce a score that evaluates the feature descriptor for each pixel position in the image data;
 calculate, for each pixel position in the image data, a cumulative score obtained by accumulating all scores in an area including a minor angle that is formed by a half line extending in a predetermined first direction from the each pixel position serving as a starting point and another half line extending in a predetermined second direction from the each pixel position, and write the calculated cumulative score in the memory;
 designate a plurality of quadrilateral areas by changing a location and a size, each of the plurality of quadrilateral areas enclosed by two lines that are in parallel with the first direction and two lines that are in parallel with the second direction; and
 with respect to each of the designated quadrilateral areas, read cumulative scores at pixel positions at vertexes of the designated quadrilateral area from the memory, and calculate an area evaluation value that is a total of the scores in the designated quadrilateral area on the basis of the cumulative scores which have been read from the memory.

2. The apparatus according to claim 1, wherein
the quadrilateral area has a first vertex, a second vertex located in an area including a minor angle formed by a half line that extends in the first direction from the first vertex serving as the starting point and another half line that extends in the second direction from the first vertex, a third vertex and a fourth vertex that differ from the first and the second vertexes, and
in calculating the area evaluation value, the hardware processor calculates a value obtained by subtracting a second addition value from a first addition value as the area evaluation value, the first addition value being a sum of the cumulative score at the first vertex and the cumulative score at the second vertex, the second addition value being a sum of the cumulative score at the third vertex and the cumulative score at the fourth vertex.

3. The apparatus according to claim 2, wherein
in calculating the cumulative score, the hardware processor selects, one by one, pixels that are two-dimensionally arranged in a first arrangement direction and a second arrangement direction in the image data by raster scanning, and calculates, as the cumulative score at the selected pixel, a value obtained by subtracting the cumulative score at a third pixel from a sum of the score at the selected pixel, the cumulative score at a first pixel, and the cumulative score at a second pixel, the first pixel being just before the selected pixel in the first arrangement direction, the second pixel being just before the selected pixel in the second arrangement direction, the third pixel being just before the first pixel in the second arrangement direction.

4. The apparatus according to claim 3, wherein
the first direction is opposite to the first arrangement direction, and
the second direction is opposite to the second arrangement direction.

5. The apparatus according to claim 4, wherein
the first arrangement direction is directed from right to left in a horizontal direction, and
the second arrangement direction is directed from up to down in a vertical direction.

6. The apparatus according to claim 1, wherein the hardware processor is further configured to:
in calculating the feature descriptor, calculate a vector including a plurality of values as the feature descriptor, and
in producing the score, produce the score on the basis of a norm between the feature descriptor and a preliminarily registered identification vector.

7. The apparatus according to claim 1, wherein a total value of the feature descriptors in an area is an evaluation target.

8. The apparatus according to claim 1, wherein the hardware processor is further configured to normalize the area evaluation value by an area of the quadrilateral area.

9. The apparatus according to claim 8, wherein the hardware processor is further configured to:
acquire a weight of the feature descriptor for each pixel position in the image data;
calculate, for each pixel position in the image data, a cumulative weight obtained by accumulating all of the weights in an area including a minor angle formed by a half line extending in parallel with the first direction from the each pixel position serving as the starting point and another half line extending in parallel with the second direction from the each pixel position;
write the cumulative weight for each pixel position in the image data, in the memory; and
with respect to each of the designated quadrilateral areas, read cumulative weights at pixel positions at vertexes of the designated quadrilateral area from the memory, and calculate a weight total value obtained by summing weights in the designated quadrilateral area on the basis of the cumulative weights which have been read from the memory,
wherein in normalizing the area evaluation value, the hardware processor normalizes the area evaluation value by the weight total value.

10. An image evaluation method, comprising:
calculating a feature descriptor that indicates a feature of an image for each pixel position in image data;
producing a score that evaluates the feature descriptor for each pixel position in the image data;

calculating, for each pixel position in the image data, a cumulative score obtained by accumulating all scores in an area including a minor angle that is formed by a half line extending in a predetermined first direction from the each pixel position serving as a starting point and another half line extending in a predetermined second direction from the each pixel position, and writing the calculated cumulative score in a memory;

designating a plurality of quadrilateral areas by changing a location and a size, each of the plurality of quadrilateral areas enclosed by two lines that are in parallel with the first direction and two lines that are in parallel with the second direction; and with respect to each of the designated quadrilateral areas, reading cumulative scores at pixel positions at vertexes of the designated quadrilateral area from the memory, and calculating an area evaluation value that is a total of scores in the designated quadrilateral area on the basis of the cumulative scores which have been read from the memory.

11. A computer program product comprising a non-transitory computer-readable medium containing a program executed by a computer, the program causing the computer to execute:

calculating a feature descriptor that indicates a feature of an image for each pixel position in image data;

producing a score that evaluates the feature descriptor for each pixel position in the image data;

calculating, for each pixel position in the image data, a cumulative score obtained by accumulating all scores in an area including a minor angle that is formed by a half line extending in a predetermined first direction from the each pixel position serving as a starting point and another half line extending in a predetermined second direction from the each pixel position, and writing the calculated cumulative score in a memory;

designating a plurality of quadrilateral areas by changing a location and a size, each of the plurality of quadrilateral areas enclosed by two lines that are in parallel with the first direction and two lines that are in parallel with the second direction; and calculating an area evaluation value that is a total of scores in the designated quadrilateral area on the basis of the cumulative scores which have been read from the memory.

12. The method according to claim 10, wherein the quadrilateral area has a first vertex, a second vertex located in an area including a minor angle formed by a half line that extends in the first direction from the first vertex serving as the starting point and another half line that extends in the second direction from the first vertex, a third vertex and a fourth vertex that differ from the first and the second vertexes, and calculating the area evaluation value includes calculating a value obtained by subtracting a second addition value from a first addition value as the area evaluation value, the first addition value being a sum of the cumulative score at the first vertex and the cumulative score at the second vertex, the second addition value being a sum of the cumulative score at the third vertex and the cumulative score at the fourth vertex.

13. The method according to claim 12, wherein calculating the cumulative score includes selecting, one by one, pixels that are two-dimensionally arranged in a first arrangement direction and a second arrangement direction in the image data by raster scanning, and calculates, as the cumulative score at the selected pixel, a value obtained by subtracting the cumulative score at a third pixel from a sum of the score at the selected pixel, the cumulative score at a first pixel, and the cumulative score at a second pixel, the first pixel being just before the selected pixel in the first arrangement direction, the second pixel being just before the selected pixel in the second arrangement direction, the third pixel being just before the first pixel in the second arrangement direction.

14. The method according to claim 13, wherein the first direction is opposite to the first arrangement direction, and the second direction is opposite to the second arrangement direction.

15. The method according to claim 14, wherein the first arrangement direction is directed from right to left in a horizontal direction, and the second arrangement direction is directed from up to down in a vertical direction.

16. The method according to claim 10, wherein:

calculating the feature descriptor includes calculating a vector including a plurality of values as the feature descriptor, and producing the score includes producing the score on the basis of a norm between the feature descriptor and a preliminarily registered identification vector.

17. The method according to claim 10, wherein a total value of the feature descriptors in an area is an evaluation target.

18. The method according to claim 10, further comprising normalizing the area evaluation value by an area of the quadrilateral area.

19. The method according to claim 18, further comprising:

acquiring a weight of the feature descriptor for each pixel position in the image data;

calculating, for each pixel position in the image data, a cumulative weight obtained by accumulating all of the weights in an area including a minor angle formed by a half line extending in parallel with the first direction from the each pixel position serving as the starting point and another half line extending in parallel with the second direction from the each pixel position;

writing the cumulative weight for each pixel position in the image data, in the memory; and with respect to each of the designated quadrilateral areas, reading cumulative weights at pixel positions at vertexes of the designated quadrilateral area from the memory, and calculating a weight total value obtained by summing weights in the designated quadrilateral area on the basis of the cumulative weights which have been read from the memory, wherein normalizing the area evaluation value includes normalizing the area evaluation value by the weight total value.

* * * * *